(12) United States Patent
Johansson et al.

(10) Patent No.: US 7,966,227 B2
(45) Date of Patent: Jun. 21, 2011

(54) SYSTEM FOR CONFIGURING A CHEMICAL SEPARATION SYSTEM

(75) Inventors: Mikael Ingvar Johansson, Uppsala (SE); Sven Torbjörn Blank, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 417 days.

(21) Appl. No.: 11/284,240

(22) Filed: Nov. 21, 2005

(65) Prior Publication Data

US 2007/0118431 A1   May 24, 2007

(51) Int. Cl.
   *G06Q 30/00* (2006.01)
(52) U.S. Cl. ................... 705/27.1; 705/26.1
(58) Field of Classification Search .......... 705/26–27
   See application file for complete search history.

(56) References Cited

U.S. PATENT DOCUMENTS

| | | | | |
|---|---|---|---|---|
| 5,515,269 A * | 5/1996 | Willis et al. | | 705/29 |
| 5,515,524 A * | 5/1996 | Lynch et al. | | 703/13 |
| 5,844,554 A * | 12/1998 | Geller et al. | | 715/744 |
| 6,003,012 A * | 12/1999 | Nick | | 705/10 |
| 6,167,383 A * | 12/2000 | Henson | | 705/26 |
| 7,039,602 B1 * | 5/2006 | Kapadia et al. | | 705/7.29 |
| 2002/0047051 A1 * | 4/2002 | Borders et al. | | 239/69 |
| 2003/0028449 A1 * | 2/2003 | Heinen et al. | | 705/27 |
| 2005/0203718 A1 * | 9/2005 | Carek et al. | | 703/1 |
| 2006/0020629 A1 * | 1/2006 | Ramani et al. | | 707/104.1 |
| 2006/0100934 A1 * | 5/2006 | Burr et al. | | 705/26 |

OTHER PUBLICATIONS

Spiegel, Rob; "Is it RIP for PRM?" MSI, Mar. 2003, Proquest #358829181, 4pgs.*
PR Newswire; "ILOG brings buyer . . . ," Jun. 5, 2001; Dialog file 613 #00585586, 4pgs.*
PRN: "Configuration Solutions Software Ste Spans Products," PR Newswire, Oct. 25, 2002, Dialog file 613 #00837514, 4pgs.*

* cited by examiner

*Primary Examiner* — Rober M. Pond
(74) *Attorney, Agent, or Firm* — Yonggang Ji

(57) ABSTRACT

The present invention relates to a configuration system for configuring and ordering a chemical separation system, which configuration system comprises a configuration tool, a database comprising data relating to chemical separation hardware modules and the linkage of said hardware modules. Said configuration system enables a user in real-time to obtain a customized configuration of the chemical separation system. The present invention also relates to a method of selling a customized chemical separation system using said configuration system. The present invention system and method considerably shorten the time required for customizing a chemical separation system.

32 Claims, 5 Drawing Sheets

1. Technical data

1.1. System configuration

| System configuration | AKTAprocess, 6mm, Isocratic |
|---|---|
| Maximum operating flow rate | 180 l/h |
| Minimum operating flow rate isocratic / gradient | 4 l/h |
| Gradient function | No |
| Number of inlets pump A | 2 |
| Number of outlets | 2 |
| Column connections | 1 |
| Level detection (air trap) | Yes |
| Air trap, automated fill | 1 |
| Filter housing | No |
| Pumps type | Triple headed diaphragm |
| Pumps amount | 1 |
| Conductivity meter, post pump | 1 |
| Conductivity meter, post column | 1 |
| Pressure meter, post pump | 1 |
| Pressure meter, pre column | 1 |
| pH meter, post column | 1 |
| UV meter, post column | 1 |
| Flow meter, pre column | 1 |
| Temperature, integrated in conductivity meter | 2 |
| Air detection, sample inlet | 1 |
| Air detection, pre column | 1 |

1.2. Environmental ranges

| Maximum operating pressure | 6 bar |
|---|---|
| Ambient temperature range | 2 - 30 degrees Celsius |
| Process temperature range | 2 - 60 degress Celsius |
|  | max 3 bar at 40 - 60 degrees Celsius |

1.3. Dimensions

| Space requirements system, W x L x H | 850 x 1236 x 1670 mm |
|---|---|

1.4. Enclosure protection class

| Enclosure protection class | See applicable codes and standards |
|---|---|
| Cabinet | IP 56 (NEMA 4X) |

Figure 4

| Tag no | Description | Remark |
|---|---|---|
| AE-381.151<br>AE-381.152 | Airsensor 6mm-3/8in<br>Internal Code No.: 03005349<br>Manufacturer: GE Healthcare<br>Process connection: 3/4inch Tri-Clamp (TC25), ID 6mm<br>Wetted material: PEEK<br>Wetted finish: Ra 0.5<br>Miscellaneous: Flange to Flange dimension: 100mm | |
| AT-221, XV-023, LEH-381.167, LEL-381.166 | Airtrap, 6mm, PP, EPDM<br>Internal Code No.: 03011145<br>Manufacturer: GE Healthcare<br>Process connection: 3/4inch Tri-Clamp (TC25), ID 6mm<br>Wetted material: Polypropylene, EPDM, glass<br>Wetted finish: Ra 0.5<br>Holdup volume: 1.2L<br><br>Autoventilation valve<br>Manufacturer: Gemü<br>Communication interface: ASi<br>Wetted material: Polypropylene, EPDM | |
| | Cabinet<br><br>Internal Code No.: 03011241<br>Manufacturer: GE Healthcare<br>Enclosure material: EN 1.4401(316) | |
| A1 | Internal I/O connection<br>Internal Code No.: 03010082<br>Model: VS-15-BU-DSUB/16-MPT-0,5<br>Manufacturer: Phoenix Contact<br>Manufacturer Internal Code No.: 1688094 | |
| B1 | Fan<br>Internal Code No.: 03011009<br>Model: IQ150FPW-236-SS<br>Manufacturer: Ice Cube | |
| CB4 | Circuit breaker<br>Internal Code No.: 03010509<br>Model: S201K10A<br>Manufacturer: ABB | |
| HS1 | System power switch<br>Internal Code No.: 03010420 | |

Figure 5

SYSTEM FOR CONFIGURING A CHEMICAL SEPARATION SYSTEM

FIELD OF THE INVENTION

The present invention relates to a configuration system for configuring a chemical separation system, which system enables a user to in real-time obtain a customised configuration of the chemical separation system. The present invention also relates to a method of selling a customised chemical separation system using a configuration system.

BACKGROUND OF THE INVENTION

Computer-based systems for configuring a customised merchandise are known, for example from the car sales market, where a user through a software-based program can chose car parameters, such as colour, decorative elements, equipment packages, engine size, etc, and then place his order. The resulting customisation may also be presented as real-time modifications of the car's appearance. Mutually conflicting selections are not possible. For example, it is not possible to select broad tyres alone as an option to an economy version of the car, since broad tyres is an option associated with certain rim types, wherefore new rims must then be chosen.

P. Conti et al ("Integrating expert systems for high-performance liquid chromatographic method development". Chemometrics and Intelligent Laboratory Systems, 11, 27-35 (1991)) describes a complex expert system for high-performance liquid chromatographic method development. The expert system is obtained by linking several small stand-alone expert systems (modules), each representing a part of the entire domain. The authors of the article have attempted to solve the problem of how to create expert systems for high-performance liquid chromatography by making stand-alone chemical separation modules cooperate with each other.

The process of selling a customised chemical separation system is a laborious process for both sales persons as well as buyers. The process starts when a customer presents his specific requirements to the sales person. If the customer's needs cannot be met with available products, a project team which includes technicians from the selling and buying companies is formed. For complex cases, a project leader may also have to be involved. The process may, especially for complex systems, require many months, typically 6-12 months, before the system is operational. Customised products, requiring project teams for their creation, often generate very poor profits for the sales company.

Thus, there is a need for making the customisation process more rapid, in order to free sales resources and decrease the development costs associated with customised products, and thereby increase the profits for the sales company, as well as enabling the customer to more quickly obtain an operational, customised chemical separation system, thus shortening delays in production, reducing the customer's costs, and in the end, increasing his profits.

To the present date, no system for configuring a chemical separation system, which gives a customer the possibility to in real-time customise said system, or a method of selling a customised chemical separation system using such a configuration system, has yet been presented.

SUMMARY OF THE INVENTION

The present invention provides a novel and efficient way of enabling a customised chemical separation system to be configured and ordered.

In one aspect, the present invention relates to a system for configuring and optionally ordering a chemical separation system, comprising a configuration tool, a database comprising data relating to chemical separation hardware modules, including how they are linked and controlled, which system enables a user in real-time to obtain a customised configuration of the chemical separation system. The user may be a customer or a sales person helping the customer to configure the system.

In a second aspect, the present invention relates to a method of selling a customised, configured chemical separation system, wherein a user customises a desired chemical separation system using the inventive system for configuring and optionally ordering a chemical separation system. The inventive system may generate personalised configuration data in the form of user-viewable graphical representations, which the user can save as a template for future modifications of the system, download for further consideration, and/or use as the specification of a system in a purchase order.

The fact that data (visual, technical, performance, construction, etc.,) relating to the user's customised chemical separation system is provided in real-time, enables the user to see and understand how the final chemical separation system will look like, what capacity it will have, how to operate it, and to confirm that its constituent hardware modules will be compatible and optimised. This makes it easier for the user to select system components in a structured fashion.

The real-time provision of the extensive information relating to the chemical separation system, gives the user a real-time picture of the system, and optionally includes the sales price, which makes it much easier for the user to decide if to proceed with the purchase, whereby the decision phase is facilitated and shortened.

All the configuration data may be downloaded as user-viewable graphical representation files, and the customised configuration may be identifiable by a user identification number or code, including an order number, a time stamp, etc, in order to simplify identification of the configuration data and to ensure the correct configuration data is used when placing and fulfilling a purchase order for a system. The data files comprising the user-viewable graphical representations may be used as a purchase order and manufacturing specification when ordering the system, whereby the purchase phase is also facilitated and shortened. The data files may be stored for future use, for example for use as a spare parts list.

Since all the constituent hardware modules and associated control software for use in such a separation system have preferably already been made compatible and optimised, the time to construct, test, and assemble the separation system is also decreased.

An advantage of the present invention is the provision of a means and a method of obtaining a customised, fully operational chemical separation system within a total time of typically 8 weeks, i.e. from the start of the configuration to the delivery of the separation system. This means that the time to delivery of the system could be reduced substantially, compared to present processes for customising chemical separation systems.

Some important benefits of the present invention for the sales company are that sales resources are freed and that the development costs associated with customised products are decreased to a level that make them profitable. A customer will swiftly obtain an operational, customised chemical separation system, thus shortening delays in production and reducing the customer's costs, and in the end, increasing his profits.

BRIEF DESCRIPTION OF THE DRAWINGS

FIG. 4 is a sheet of the general specification of the configured system shown in FIG. 2.

FIG. 5 is a sheet of the bill of material of the configured system shown in FIG. 2.

DETAILED DESCRIPTION OF THE INVENTION

According to the invention, one embodiment of the method of selling a customised, configured chemical separation system, wherein a user customises his chemical separation system by choosing hardware modules using a system for configuring a chemical separation system comprising a configuration tool and a database comprising data relating to chemical separation hardware modules, comprises the steps of:
- the user selecting hardware modules defining said chemical separation system;
- the configuration tool (C.T.) generating configuration data based on the user-selected hardware, said configuration data reflecting said chemical separation system and chemical separation system data;
- the C.T. accepting the user's hardware selection as a compatible selection;
- the C.T. presenting the user's hardware selection accepted by the C.T. and configuration data as a user-viewable graphical representation;
- the user accepting the presented hardware selection and configuration data; and optionally
- the user placing an order for the customised system.

Figure 1:
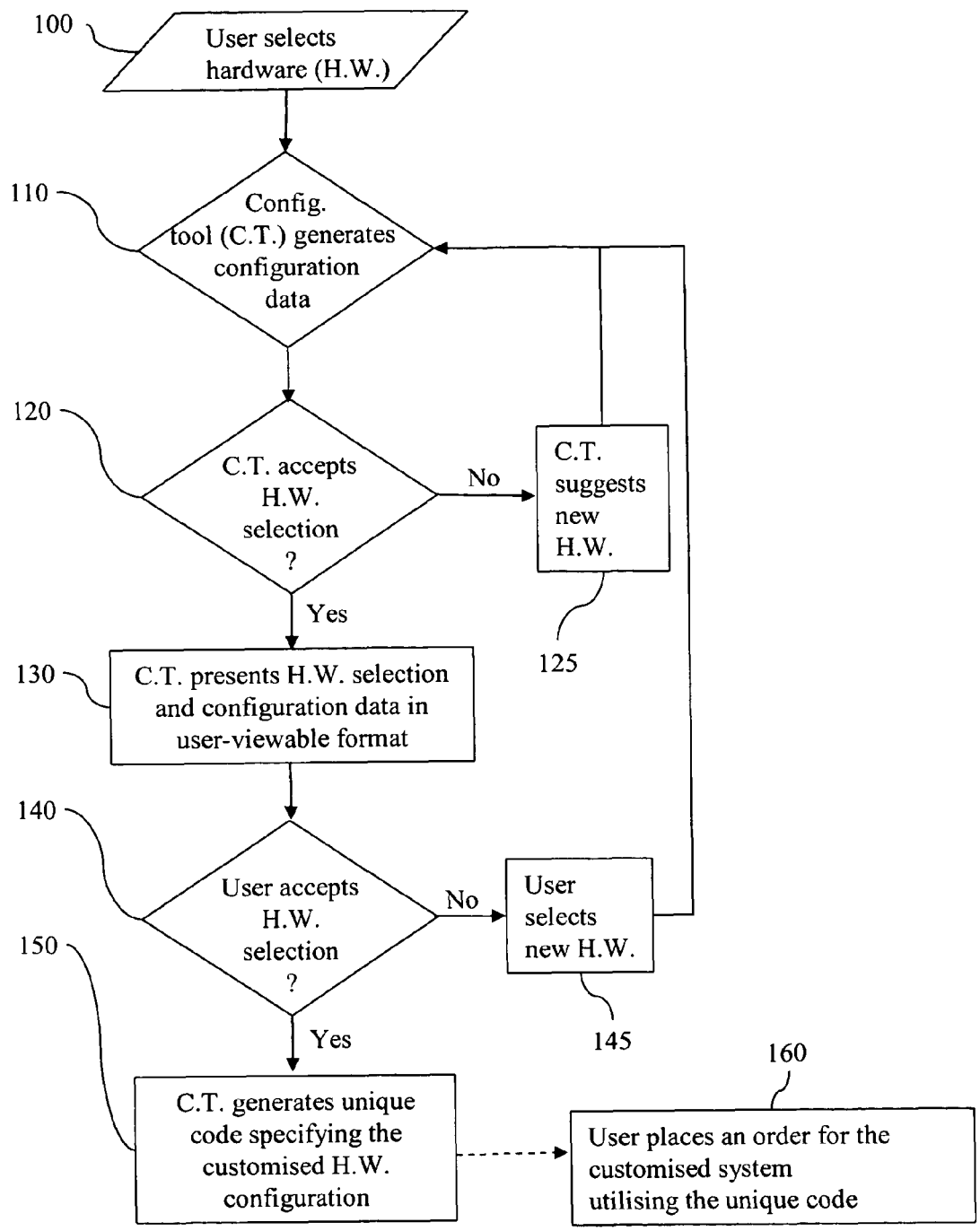
FIG. 1 is a flow chart of the method of selling a customised, configured chemical separation system according to an embodiment of the present invention
Figure 2:
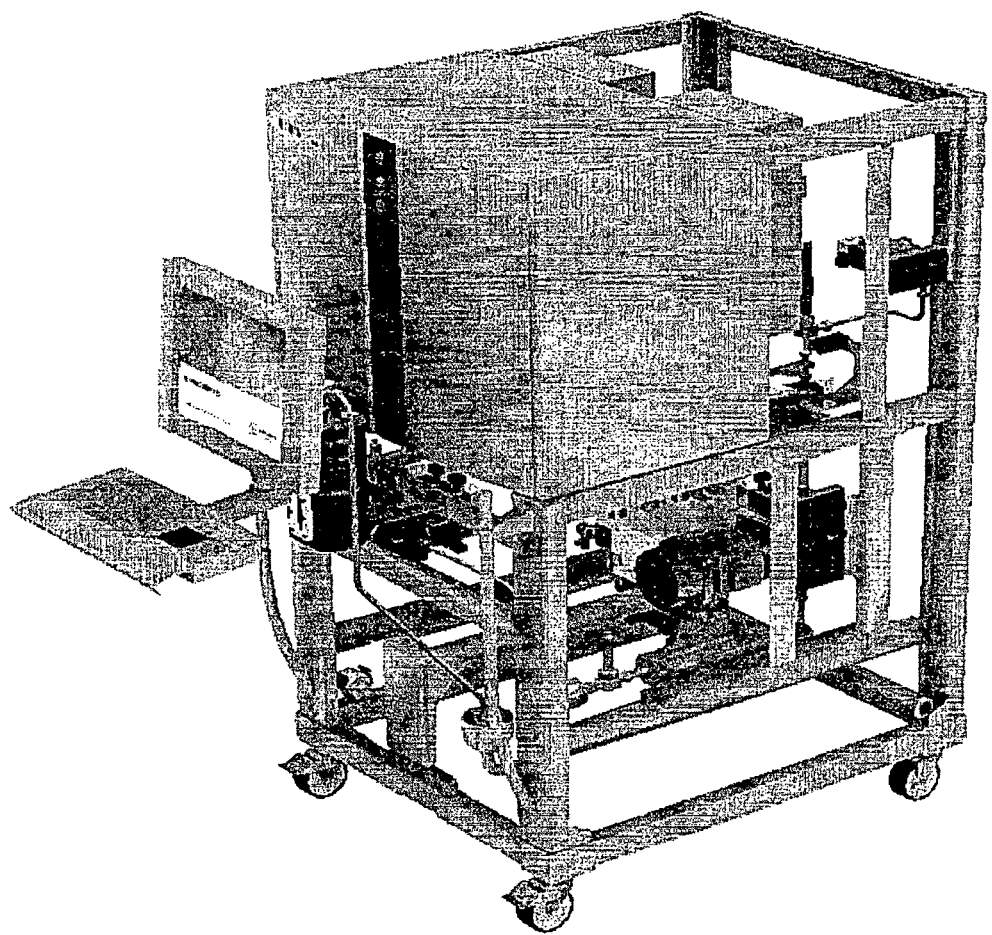
FIG. 2 is a perspective view of a chemical separation system configured using the system for configuring a chemical separation system according to an embodiment of the present invention, showing in this case the dimensions and certain important features of the system.
Figure 3:
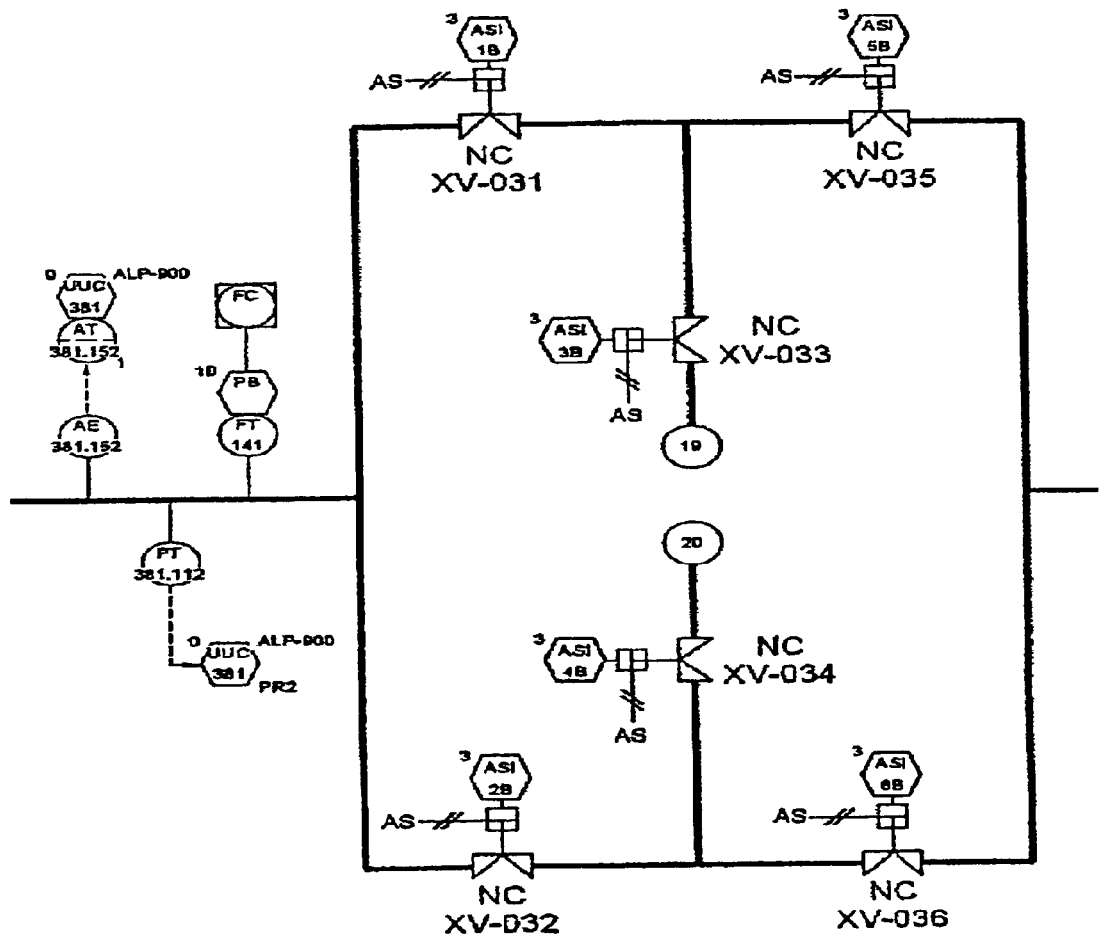
FIG. 3 is a schematic view of part of the process flow chart and its constituent hardware modules of the configured system shown in FIG. 2.

FIG. 1 describes an embodiment of the method according to the present invention illustrated by a process flowchart of the steps involved.

The first step of the method, step 100, describes when the user configures his desired system by selecting initial hardware modules. The user may start the configuration from scratch, selecting one hardware module after the other, or from a default system configuration where hardware modules have already been chosen.

In step 110, the C.T. (operatively linked to a data base comprising data relating to hardware modules, software modules, settings, capacity, and the like, as data files) generates configuration data resulting from the user's initial customised hardware selection. Said configuration data may be downloaded by the user.

In step 120 the C.T. evaluates the hardware selections made by the user. Should the hardware be selected in a way that the configuration tool accepts as generating a compatible or optimised configuration, the configuration tool will in step 130 then present graphical representations of the chosen hardware and configuration data related to the hardware.

The configuration data presented in step 130 includes details relating to the customised chemical separation system, such as details relating to the construction, modularised control software, process flow charts, process settings, capacity, and at least one graphical representation of the chemical separation system as assembled. Said configuration data is presented as user-viewable data and may be downloaded by the user.

Should the selected hardware modules selected in step 100 not be compatible with each other or represent a non-optimised hardware selection according to the C.T. in step 120, the C.T. preferably displays solutions to overcome said incompatibility or changes in the chosen hardware to optimise the performance are suggested by the C.T. in step 125. Such incompatible or non-optimised hardware selections may be displayed with a different colour, font or in some other way highlighted in order to distinguish them from compatible or optimised selections. Should the user change the configuration according to the suggested solutions, he will return to step 110 where the C.T. generates new configuration data that it will accept in step 120, and in step 130 presents as graphical representations of the selected hardware and configuration data related to said hardware.

In step 140 the user evaluates his chemical separation system and its configuration data as presented by the C.T.

Should the user not be satisfied with the hardware selection and configuration data presented by the C.T. in step 130, he may then in step 145 select new hardware from which the C.T. will generate new configuration data, i.e. returning to the step 110 of generating configuration data.

Should the user in the step 140 be satisfied with the presented customised configuration data, and accepts it, the C.T. will then in step 150 generate a unique code identifying the user's customised hardware selection and configuration data.

The order takes place if the user in step 160 orders the system utilising the unique code. The order may be performed by utilising the unique code and/or the generated configuration data. Preferably, at least part of the configuration data is used by a sales company as a manufacturing specification of the user's customised chemical separation system.

If the step of generating the configuration data is generated in a user's stand-alone computer, by the C.T., said configuration data may be transferred as electronic data files to the sales company as a purchase order. If the configuration data for example is generated by the user in the sales company's web-based system for configuring a chemical separation system, then the personal identification number, identifying the data relating to the user's customised configuration, may be used as a purchase order. In both cases, the user-viewable graphical representations with its unique identification number may be used by the sales company as the manufacturing specification of the user's customised chemical separation system.

Preferably, for security reasons, the access to the system for configuring a chemical separation system is obtained through the provision of a user key.

According to the invention, a first embodiment of the system for configuring and ordering of a chemical separation system, comprises:
- a configuration tool (C.T.) adapted to generate configuration data and determining if a hardware selection is compatible, said C.T. comprising:
- a database comprising data relating to chemical separation hardware modules, including how they are linked and controlled, and
- computer hardware and software for running said C.T. and inputting data to, and outputting data from, said C.T.,
- a user interface adapted to enable a user to select hardware modules,
- a graphical user interface adapted to receive configuration data from the C.T. and display the configuration data to a user in a user-viewable format, wherein the user interface enables a user to accept a presented configuration of the chemical separation system, wherein the system is adapted to enable a user to select hardware modules comprised in a chemical separation system, to generate configuration data relating to said chemical separation system, and to display it as a user-viewable graphical representation, such that the user in real-time obtains a customised configuration of the chemical separation system and may order a fully functional chemical separation system.

Said C.T. may be an expert system or configuration tool according to the present invention, or a conventional expert system or configuration tool, or any other computerised system capable of performing the steps in the method according to the present invention. The C.T. calculates if selected hardware modules in the chemical separation system are compatible with each other and what the capacity of the customised chemical separation system will be, based on the information provided by the database. The C.T. may also calculate how non-compatible hardware selections may be made compatible, or how a non-optimised performance of the chemical separation system may be improved. Said C.T. is preferably software-based.

The hardware modules for which information is stored in the database include conventional components of a chemical separation system, such as separation columns, pumps, valves, connectors, tubing, filters, detectors, and the like. Information on software that controls hardware modules may be associated with the respective hardware modules. The database also comprises information on how the different hardware modules can be linked and their respective capacity. The content of the database depends on what type of chemical separation system is to be customised.

The configuration data relating to the customised system are in real-time updated by the C.T. and displayed by the graphical user interface when the user changes a changeable parameter of the customised system. Preferably the graphical user interface in real-time displays graphical representations relating to at least one of: the construction details, modularised control software, process flow charts, process settings, capacity, and at least one graphical representation of the chemical separation system. Optionally the price of the configured system is displayed to the user, in which case the real-time updates may also include an updated price.

Any of the user's hardware selections that the C.T. deems incompatible or leading to non-optimised performance may be displayed by the graphical user interface with a different colour, font or are high-lighted with respect to compatible or optimised choices, and the system may also suggest solutions to overcome said incompatibility or to optimise the performance of the customised chemical separation system.

The configuration system according to the present invention may generate a unique identification code identifying the details relating to the customised configuration of the chemical separation system. Said C.T. may also generate downloadable customised configuration data in the form of computer-readable files and user-viewable files comprising at least one of: unique identification code, information relating to the construction details, modularised control software process, flow charts, process settings, capacity, and graphical representations of the chemical separation system as assembled.

In one embodiment of the system according to the invention, the C.T., or the C.T. and the database, is/are located in a customer's or a sales person's stand-alone computer. In another embodiment, the C.T. and/or database is/are located in the sales company's server or computer network, which are accessible via a web-based (internet) connection.

The present configuration and ordering system is suitable for all kinds of system size—ranging from laboratory scale systems to industrial scale systems. The present invention relates to configuration of chemical separation systems, specifically to chemical separation systems, and more specifically to chromatographic separation systems. However, the present invention is applicable to similar chemical separation systems, such as filter systems or analytical systems.

What is claimed is:

1. A computer-based method of selling a customised, configured chemical separation system, comprising the steps of:
   selecting, by a user, hardware modules defining said chemical separation system, wherein data related to the hardware modules are stored in a database accessed by a configuration tool executed by the computer;
   using the configuration tool to generate configuration data based on the user-selected hardware modules, said configuration data including information relating to one or more properties selected from the group of: construction details, modularised control software, process flow charts, process settings, capacity, and a graphical representation of the user's customised chemical separation system;
   determining by the configuration tool a selected hardware module is compatible with previously selected hardware modules and represents a non-optimised hardware module selection;
   calculating by the configuration tool how to improve the performance of the non-optimised hardware selections;
   suggesting one or more hardware modules based on the calculations that optimizes the chemical separation system performance;
   accepting the selected one or more hardware modules wherein the selected hardware module is determined to be compatible with the previously selected hardware modules and optimises the chemical separation system performance;
   using the configuration tool to present in real-time the user's hardware selection accepted by the configuration tool and configuration data as a user-viewable graphical representation; and
   providing the configuration data to a sales company and using the configuration data as a manufacturing specification of the user's customised chemical separation system.

2. The method of claim 1, wherein the user, when selecting the hardware selection suggested by the configuration tool, returns to the step of generating configuration data.

3. The method of claim 1, further comprising prompting a user to select new hardware when at least one of the hardware selection or the configuration data presented by the configuration tool is not accepted, and return to the step of generating configuration data.

4. The method of claim 1, further comprising a step where the configuration tool generates a unique code identifying the user's hardware selection and configuration data.

5. The method of claim 4, wherein the user places an order for the chemical separation system using the unique code.

6. The method of claim 1, wherein said configuration data is downloadable by the user.

7. The method of claim 1, wherein said graphical representation is downloadable by the user.

8. The method of claim 1, wherein the step of generating the configuration data takes place in a customer's or a sales person's stand-alone computer.

9. The method of claim 1, wherein the step of generating the configuration data takes place in a web-based system for configuring a chemical separation system.

10. The method of claim 1, wherein access to the C.T. is obtained through the provision of a user key.

11. The method of claim 1 further comprising permitting the user to enter a user's hardware selection as a compatible selection.

12. A system for configuring and ordering of a chemical separation system, comprising:
a computer;
a configuration tool installed on the computer;
a database including data relating to chemical separation hardware modules, including how the hardware modules are linked and controlled,
a user interface coupled to the computer and adapted to access the database to enable a user to select hardware modules to define the chemical separation system, the configuration tool further adapted to generate configuration data relating to a chemical separation process based on the selected hardware modules, determine a selected hardware module is compatible with previously selected hardware modules and represents a non-optimised hardware selection, calculate how to improve the performance of the non-optimised hardware selections; and suggest, one or more, hardware modules that optimizes the chemical separation system performance;
a graphical user interface adapted to receive the configuration data from the configuration tool and display the configuration data and the selected hardware modules to the user in a user-viewable format, wherein the graphical user interface, in real-time, displays graphical representations relating to one or more properties selected from the group of: the construction details, process flow charts, process settings, capacity, and at least one graphical representation of the chemical separation system, wherein the user interface enables a user to accept the selected one or more hardware modules wherein the selected hardware module is determined to be compatible with the previously selected hardware modules, wherein the graphical user interface displays any incompatible or non-optimised module hardware choices with a different colour, font or high-lighting, and,
wherein the configuration data is used by a sales company as a manufacturing specification of the user's customised chemical separation system; and wherein the configuration data comprise a purchase order and can be stored for future use.

13. The system of claim 12, wherein the graphical user interface, in real-time, displays graphical representations relating to modularised control software.

14. The system of claim 13, wherein the graphical user interface is able to display graphical representations that are downloadable.

15. The system of claim 12, wherein the configuration data relating to the customised system are in real-time updated by the configuration tool and displayed by the graphical user interface when the user changes a changeable parameter of the customised system.

16. The system of claim 15, wherein the graphical user interface displays the price of the customised system.

17. The system of claim 12, wherein the graphical user interface suggests solutions to overcome said incompatibility.

18. The system of claim 12, wherein the configuration tool generates a unique identification number relating to the customised configuration of a chemical separation system.

19. The system of claim 12, wherein the configuration tool, or the configuration tool and the database, is/are located in a customer's or a sales person's stand-alone computer.

20. The system of claim 12, wherein the configuration tool and/or database is/are located in a sales company's server or computer network, which are accessible via a web-based connection.

21. The system of claim 12, wherein said system is a system for configuring a chromatographic separation system.

22. The system of claim 12, wherein said system is a system for configuring an analytical separation system.

23. The system of claim 12, wherein said system is a system for configuring a filter separation system.

24. The system of claim 12 wherein the graphical user interface is further adapted to store the selected hardware modules and the configuration data related to the selected hardware modules as a template.

25. The system of claim 24 wherein the graphical user interface is further adapted to enable a user to access the stored template, modify the stored template, and save the stored template as a second set of selected hardware modules and a second set of configuration data.

26. A method of selling a customized chemical separation system, said method comprising:
receiving initial hardware module selections entered by a user, the initial hardware module selections defining a chemical separation system, wherein data related to the hardware modules are stored in a database accessed by a configuration tool executed by a computer;
generating configuration data based on the received initial hardware module selections, the configuration data including information relating to at least one of chemical separation system construction information, chemical separation system modularized control software, chemical separation system process flow charts, chemical separation system process settings, or chemical separation system capacity,
evaluating, by the configuration tool, the compatibility of the initial hardware module selections based on the configuration data and represents a non-optimised hardware module selection;
calculating by the configuration tool how to improve the performance of the non-optimised hardware selections;
suggesting one or more hardware modules based on the calculations that optimizes the chemical separation system performance;
automatically modifying at least a portion of the initial hardware module selections to generate a second set of hardware module selections;
displaying at least one graphical representation of the second set of hardware module selections.

27. The method of claim 26 further comprising:
generating configuration data based on the second set of hardware module selections; and
evaluating the compatibility of the second set of hardware module selections based on the configuration data.

28. The method of claim 26 further comprising prompting a user to accept the initial set of hardware module selections if the result indicates compatible initial hardware selections.

29. The method of claim 26 further comprising displaying in real-time the configuration data associated with the graphical representation.

30. The method of claim 26 further comprising generating a unique code that represents the second set of hardware module selections, the unique code enabling the user to order the customized chemical separation system.

31. The method of claim 26 wherein the displaying operation further comprises:
   identifying the incompatible initial hardware selections;
   altering the presentation of the incompatible initial hardware selections; and
   displaying the altered presentation.

32. The method of claim 31 wherein the altering operation further comprises at least one of highlighting, altering a color, or changing a font of a portion of the incompatible initial hardware selections.

* * * * *